United States Patent [19]

Ivansson et al.

[11] Patent Number: 5,307,575
[45] Date of Patent: May 3, 1994

[54] FRAME CORNER ASSEMBLY

[75] Inventors: Bengt Ivansson, Ursyiken; Martin Eriksson, Skellefteå; Jan Öhlund, Skelleftehamn, all of Sweden

[73] Assignee: Marketing Displays, Inc., Farmington Hills, Mich.

[21] Appl. No.: 970,612

[22] Filed: Nov. 3, 1992

[51] Int. Cl.⁵ .................................................. G09C 1/12
[52] U.S. Cl. .......................................... 40/156; 40/155; 403/403
[58] Field of Search ..................... 40/156, 159.1, 152, 40/152.1; 403/231, 230, 403, 408.1, 406.1, 405.1

[56] References Cited

U.S. PATENT DOCUMENTS

| | | | |
|---|---|---|---|
| 4,145,828 | 3/1979 | Hillstrom | 40/153 |
| 4,161,977 | 7/1979 | Baslow | 403/231 |
| 4,356,648 | 11/1982 | Beulieu | 40/156 |
| 4,630,386 | 12/1986 | Wilson | 403/403 |
| 4,993,866 | 2/1991 | Sugihara et al. | 403/403 |
| 5,011,323 | 4/1991 | Liuo | 403/403 |

Primary Examiner—Kenneth J. Dorner
Assistant Examiner—Cassandra Davis
Attorney, Agent, or Firm—Brooks & Kushman

[57] ABSTRACT

A front-loading poster frame assembly is disclosed with molded corner frame members positioned between adjacent frame sections. The corner frame members securely attach together the base portions of adjacent frame sections. The cover portions are mitered at the corners and hinged to the base portions. Interference members are situated in openings in the hinge pintle members on the base portions and prevent the cover portions from relative longitudinal movement.

13 Claims, 2 Drawing Sheets

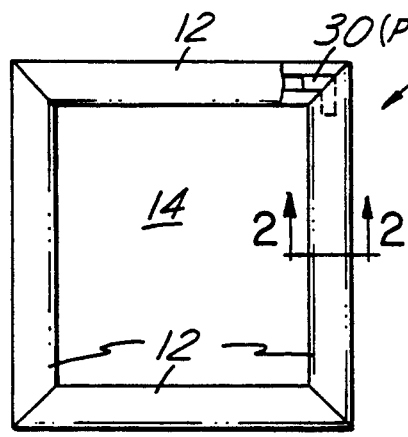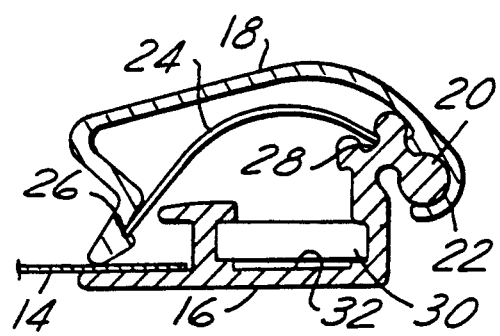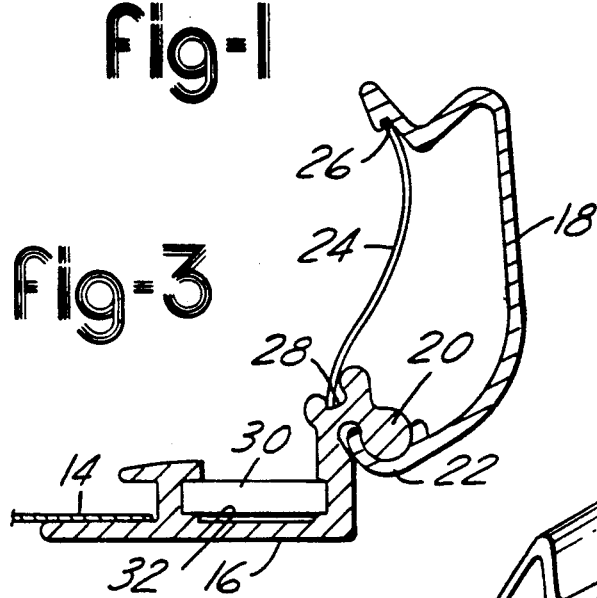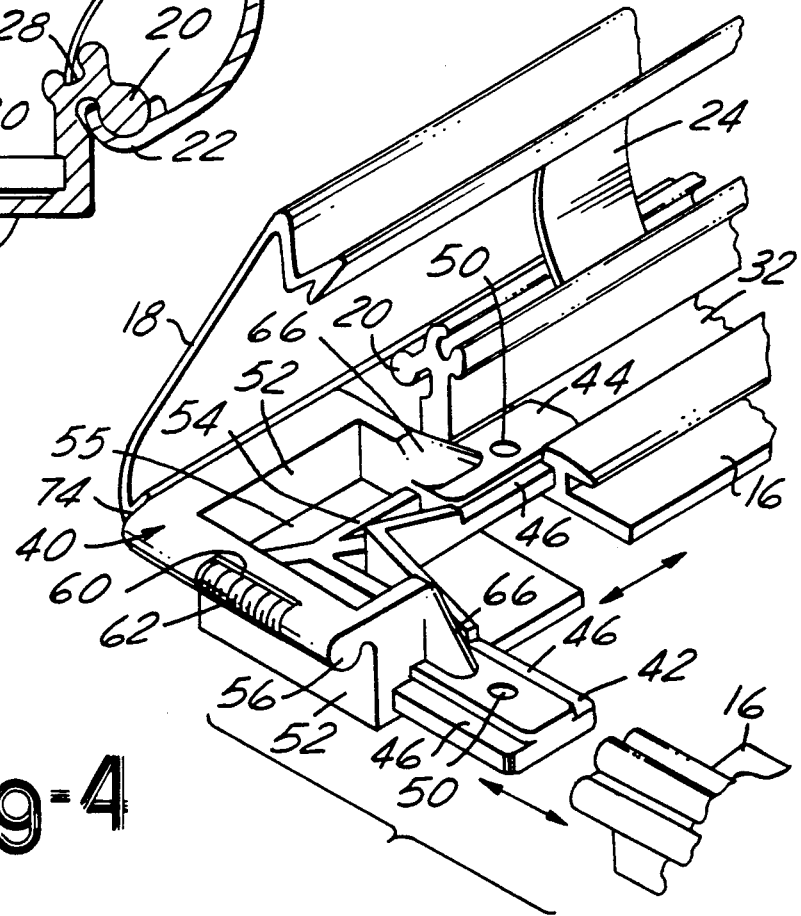

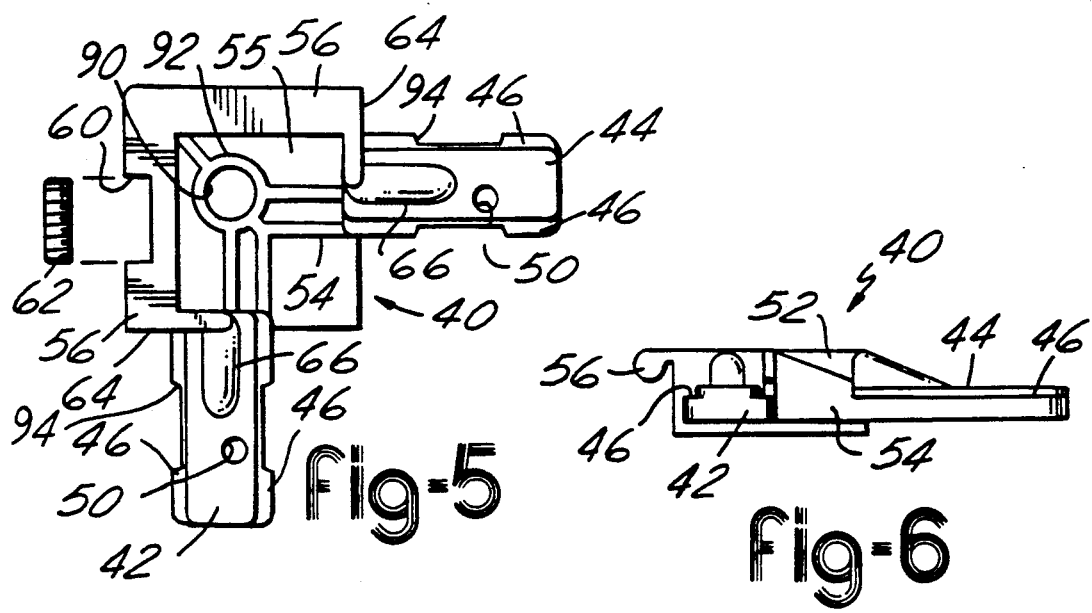
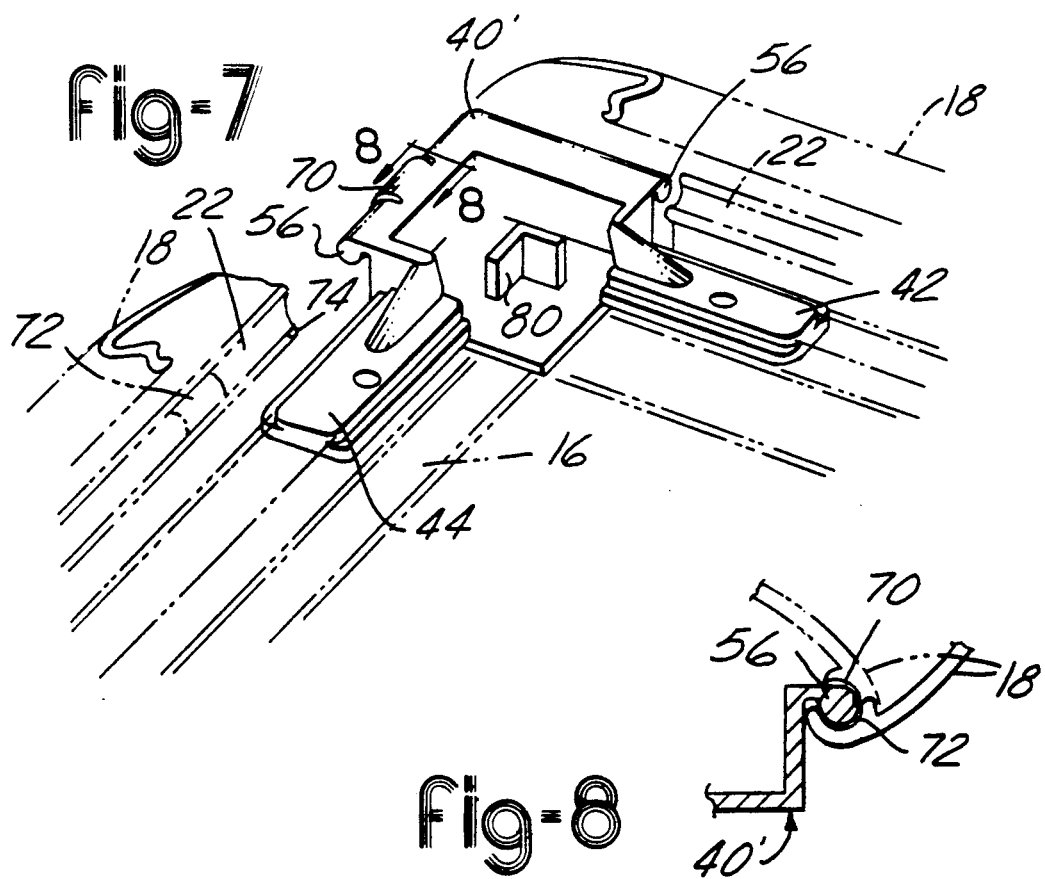

FRAME CORNER ASSEMBLY

TECHNICAL BACKGROUND

The present invention relates to front-loading poster and picture frames with mitered corners in which a molded corner assembly is used to hold adjacent frame sections together and prevent the hinged cover set members from sliding longitudinally out of position.

BACKGROUND OF THE INVENTION

Front-loading poster and picture frames are in widespread use today. They are in use particularly by various businesses which change their advertising and promotional messages in a periodic manner. The poster frames provide an aesthetic and attractive product and allow replacement and change of the promotional material in a relatively quick and easy manner. Front-loading poster frames are typically made of extruded aluminum sections, each comprising a base portion and cover member hinged together along one edge. A spring member is positioned between the base and cover members and biases the cover member in the closed position to hold the promotional material in place. The spring member also functions to hold the cover in its open position thereby allowing easy replacement of the promotional materials. Frame sections and poster frames of this type are shown, for example, in commonly-owned U.S. Pat. No. 4,145,828.

When the poster frames are rectangular or square with right-angle corners, the frame sections are cut on a 45° mitered angle which allows the frame sections to fit together to form the frame. L-shaped corner braces, typically made of metal, are used to hold adjacent frame sections together. The corner braces fit within recesses or channels in the base members of the frame section and either the corner braces or base members are secured to a backing member providing a complete poster frame.

In order to prevent relative sliding movement of the cover members longitudinally relative to the base members of the poster frames, various means and mechanisms have been used. One of these mechanisms is shown, for example, in U.S. Pat. No. 4,958,458. In accordance with that patent, the longitudinally hinged pivot pintle (or "rail") member on the base has one or more openings or notches along its length and a friction means, such as a threaded rod or the like, is press fit in the opening. The threads of the rod (or surface discontinuities) grip the longitudinal hinge socket in the cover member and prevent longitudinal movement of the cover member relative to the base member when the cover member is repeatedly rotated to its open and closed positions. A mechanism for preventing relative sliding movement of the cover member relative to the base member is provided so that the corner members do not overlap at their mitered junctions.

Some known poster and picture frames contain exposed corner members and utilize front-loading frame sections which do not use mitered corners. The corner members typically are plastic or metal and are either one-piece or multi-pieces which snap together. They are positioned at the corners of the frame and interconnect with two adjacent frame sections. The ends of the frame sections are cut perpendicular to their longitudinal axis and are not mitered. The sides of the exposed corner members prevent relative longitudinal sliding movement of the cover members relative to the base members of the frame sections and thus separate means or mechanisms for preventing relative sliding movement are unnecessary. Poster frames with exposed corner members are shown, for example, in U.S. Pat. No. 5,076,736.

It is an object of the present invention to provide a poster frame assembly which uses frame sections having mitered corners that is less costly and easier to manufacture than prior poster frames. It is another object of the present invention to provide a front-loading poster frame assembly with frame sections having mitered corners and which it is unnecessary to provide means or mechanisms for preventing relative longitudinal sliding movement in the frame sections themselves.

It is still another object of the invention to provide a poster frame assembly which saves material costs by eliminating waste in the manufacture of the frame sections. It is a further object of the invention to provide a poster frame assembly in which the members for the frame section can be standardized and produced at a faster rate.

Other objects, features and advantages of the invention will become apparent from the following description of the invention and appended claims, when viewed in accordance with the attached drawings.

BRIEF DESCRIPTION OF THE DRAWINGS

FIG. 1 depicts a picture or poster frame assembly which utilizes the present invention;

FIG. 2 is a cross-sectional view of a frame section taken in the direction of the arrows 2—2 in FIG. 1;

FIG. 3 is another cross-sectional view of a frame section of FIG. 1 (similar to FIG. 2), but shown in the open position;

FIG. 4 is a perspective exploded view illustrating use of the unique frame corner member in a poster frame;

FIG. 5 is a top elevational view of the unique frame corner member of the present invention with additional features;

FIG. 6 is a side elevational view of the unique frame corner member shown in FIGS. 4 and 5;

FIG. 7 illustrates an alternate embodiment of the frame corner member in accordance with the present invention; and FIG. 8 is a partial cross-sectional view taken in the direction of the arrows 8—8 in FIG. 7.

BEST MODE(S) FOR CARRYING OUT THE INVENTION

FIGS. 1–3 show a typical picture and poster frame 10 in which the present invention can be utilized. The frame assembly 10 contains a plurality of frame sections 12 around its periphery. Typically, four frame sections 12 are provided which form the square or rectangular frame 10.

The frame sections are arranged in the configuration shown in FIG. 1 and are typically attached to a backing member or the like. The poster frame 10 is "front-loading" which means that the front of the frame sections can open and close to allow removal and replacement of the poster material 14. In this manner, the poster frame 10 can be permanently secured to a wall or other structure.

FIGS. 2 and 3 illustrate the details of the individual frame sections 12. The frame sections 12 include a base member 16 and a cover member 18 which are hingedly secured together. The hinge mechanism comprises an elongated pivot pintle (or "rail") member 20 which is positioned on the base member and a corresponding elongated socket or cup member 22 which is provided on the cover member. The structures of the pintle and socket members are such that the cover and base members are assembled by sliding one longitudinally relative to the other.

The cover members 18 are biased by spring members 24 to the base member. The spring members 24 are positioned between recess 26 in the cover member 18 and channel 28 in the base member 16.

A poster frame having frame sections of the type described above is shown, for example, in U.S. Pat. No. 4,145,828 which is assigned to the same assignee as the present invention. The disclosure of the '828 patent is hereby incorporated by reference herein.

In accordance with the '828 patent, the base member and cover member are made from an extruded aluminum material and provided in the cross-sectional sizes and shapes shown. The spring biasing members 24 are made from spring steel. When the cover member and base member are in their closed positions, as shown in FIG. 2, the spring member 24 acts to hold them tightly together. This allows the frame sections to hold a poster or other promotional material 14 in place in the frame 10. In order to change or replace the material 14, the cover member 18 is rotated to its open position, as shown in FIG. 3. When the cover members of all of the frame sections around the perimeter of the frame assembly 10 are rotated to their open positions, the material 14 can be easily removed and replaced. When the cover member 18 is open in the position shown in FIG. 3, the spring member 24 acts to hold the cover member in that position.

As shown in FIG. 1, the cover members of the frame sections are each mitered at a 45° angle at their ends in order to allow the frame sections to fit together in the manner shown. In order to produce the mitered corners, each of the cover members 18 are cut and mitered separately.

The frame sections 12 are held together at the corners by L-shaped brace (or "key") members 30. The brace members 30 are inserted in recesses or channels 32 in adjacent base members and hold the base members together and in position by friction or fastening means of any conventional type.

It is also important to prevent relative longitudinal sliding movement of the cover members 18 relative to the base members 16 of the frame sections when the cover members are rotated between their open and closed positions (to allow removal and replacement of poster material 14). If the cover members 18 were to slide or move longitudinally relative to the base members 16, then adjacent cover members would overlap and interfere with one another. This would prevent proper functioning of the frame assembly and reduce its attractiveness and functionality. One mechanism for preventing such relative longitudinal movement is shown, for example, in U.S. Pat. No. 4,958,458. The '458 patent is owned by the same assignee as the present invention and the subject matter of the '458 patent is hereby incorporated herein by reference.

In accordance with the '458 patent, at least one opening or notch is formed in the elongated pintle member 20 of each base member 16 and an interference member, such as a small threaded rod or the like, is positioned in the opening and creates an interference fit with the mating socket 22 in the cover member 18. The interference member which is positioned in the opening in the hinge pintle 20 prevents longitudinal relative movement of the cover member 18 of each frame section 12 relative to the base member 16.

The unique corner member in accordance with the present invention is shown in FIGS. 4-6. The corner member 40 is molded in the shape and configuration shown. The corner member 40 can be made of any material, but preferably is made from a plastic material, such as 10% fiberglass filled polycarbonate or ABS.

The corner member 40 replaces both the L-shaped brace members 30 described above and also prevents notching of the hinge pintles 20 on the base members which is a time consuming manufacturing process.

With use of the unique corner members 40, waste material is reduced and minimized in forming the base and corner members, and the frame sections and its component parts can be standardized. The ends of the cover members 18 are mitered at 45° angles, but the ends of the base members can be cut perpendicular to their longitudinal axis. It is also possible to cut two or four base members 16 at the same time which creates an improved and more efficient manufacturing process.

The corner member 40 has a pair of extending connection portions 42 and 44 which extend from the main body of the corner member. The portions 42 and 44 are positioned preferably at right angles to one another and are configured to be inserted fit within the recesses or channels 32 in the base member 16 (FIG. 4). The connection members 42 and 44 have stepped upper ridges on the upper portions thereof which facilitate centering of the frame corner member 40 in the channels 32 in the base member 16.

One or more openings 50 are positioned in each of the connection members 42 and 44 for fastening and securing of the corner member 40 to the base of each of the frame sections 12. A pop rivet, screw, or other conventional fastening means can be used to fasten the corner members 40 to the base member 16 by means of the openings 50.

The corner member 40 also has a raised outer wall 52 and a smaller raised inner wall 54 for support and rigidity. Ridges 55 can be provided for additional rigidity and support. A hinge pintle portion 56 is positioned on the wall 52 and extends around the two outer surfaces or portions of the corner member 40. The pintle members 56 preferably have the same cross-sectional shape as shown (FIGS. 4-6) and are adapted to be positioned in axial alignment with the elongated pintle members 20 on the base member 16. In this manner, when the frame sections are assembled together and the corner member 40 is inserted in position between adjacent base members 16, the pintle portion 16 becomes axially aligned with the rail portions 20 forming a continuous pintle member for hingedly mating with the cover members 18.

An opening or notch 60 is positioned in the pintle member 56 along one side of the corner member 40. A raised or threaded interference member 62, such as a threaded rod member, is inserted in the opening 60 and held in place by an interference engagement. The threaded member 62 is adapted to mate with the cover member 18 which is positioned on its corresponding base member 16 and prevents relative longitudinal movement of the cover member relative to the base member. The notch 60 is about one-half of an inch in length, or about 3 mm.

It is only necessary to include one opening 60 and one interference member 62 on each of the corner members 40 in accordance with the present invention. Since there are four frame sections per poster frame assembly 10 and four corner members will be provided, this means that each of the four cover members 18 will be held in place at one of the corners. It is also possible, of course, to provide two openings and two interference members 62 in each of the corner members 40 if desired.

As shown in FIG. 4, when the unique corner member 40 is utilized, only the cover members 18 need to be cut at 45° mitered angles at their ends. The base members 16 are cut 90° at both ends and fit between adjacent corner members 40. In this regard, wall 64 of the corner members 40 provides a positive stop for placement of the base members 16 around the periphery of the poster frame.

In the corner members 40, reinforcing ribs 66 are provided connecting members 42 and 44 with the main body of the corner member. This provides increased strength and integrity for the corner member 40 and prevents the connection members 42 and 44 from breaking or snapping off during assembly or if the poster frame 10 were to be dropped.

FIG. 5 also shows alternate or additional features which can be utilized on the inventive corner member 40 if desired. A mounting opening or hole 90 can be molded into the center of the corner member as shown. Screws or other fasteners can be inserted through the hole 90 in the corners of the poster frame 10 and used to fasten or secure the frame 10 to a wall or other surface. A raised ridge or boss 92 is preferably formed around the opening 90 and connected to reinforcing ribs 55.

Also as shown in FIG. 5, recessed portions 94 can be provided on the sides of the connection members 42 and 44. The recesses 94 allow the sides of the channels 32 in the base members 16 to be swaged into them thereby securely fastening the frame members to the corner members without use of fasteners in openings 50.

It is understood that the features 90, 92 and 94 can be utilized in any of the embodiments of the invention as desired, or the corner members can be secured to the frame members by use of openings 50 and the completed poster frame 10 can be secured to a wall or other mounting surface by any conventional means (such as by drilling mounting holes in channels 32 and using conventional fasteners).

An alternate embodiment of the invention is shown in FIGS. 7 and 8. The corner member 40' is similar to the corner member 40 described above in most respects, except for the distinctions noted below. The corner member 40' has a pair of connection members 42 and 44 and has a shape and configuration substantially the same and for the same purposes as corner member 40. The corner member 40', however, has a raised locking tab or knob 70 positioned in the hinge pintle 56 (rather than having a notch and separate interference member 62). The raised locking tab or knob 70 is provided in the corner member 40' when it is molded. In order to use the corner member 40', however, a corresponding opening or recess 72 is provided in the cover member 18. The opening or recess 72 in the cover member can be formed when the rear edges 74 of the cover members 18 are notched for clearance. (The rear edges 74 of each of the mating cover members 18 are notched or mitered slightly so that the rear edges do not interfere with one another when two adjacent cover members 18 are rotated to their open positions.)

Corner member ' also contains a raised wall member 80 which is positioned to function as a corner stop for the poster or promotional materials 14 which are positioned in the frame assembly 10.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A corner frame member for a poster frame made of a plurality of frame sections, said corner frame member comprising:
    a body portion;
    a pair of connection members extending from said body portion for mating with said frame sections;
    a wall member on said body portion;
    rail hinge means on said wall member for mating with a channel hinge means on a mating frame section;
    gap means on said rail means; and
    insert member positioned in said gap means for forming an interference fit with said channel hinge means and preventing relative longitudinal sliding of said frame section relative to said body portion.

2. The corner frame member of claim 1 further comprising reinforcing means reinforcing the junction between said connection members and said body portion.

3. The corner frame member of claim 1 wherein said insert members have stepped means thereon to facilitate insertion and positioning in said frame sections.

4. The corner frame member of claim 1 wherein said connection members have openings therein to facilitate secure connection of said corner frame member to said frame sections.

5. The corner frame member of claim 1 further comprising first stop means on said body portion to facilitate positioning of said frame sections relative to said corner frame member.

6. The corner frame member of claim 5 further comprising second stop means on said body member to facilitate placement of poster material in said frame sections.

7. The corner frame member of claim 1 wherein said wall member and rail hinge means extend around two adjacent sides of said body portion.

8. A poster frame comprising a plurality of frame sections assembled together, each of said frame sections comprising a cover member and a counterpart base member hingedly connected together, and a biasing member biasing said cover member relative to said base member, the improvement comprising:
    a corner member having a body portion and a pair of connection members, said body portion being positioned between two of said base members of two of said adjacent frame sections, said connection members being secured to said base member holding said corner member in place; and
    means on said body portion for preventing sliding longitudinal movement of at least one of said cover members relative to its corresponding base member.

9. The corner frame member of claim 8 wherein said means for preventing movement comprises an interference member positioned on said body portion.

10. The corner frame member of claim 9 wherein said interference member comprises a threaded rod positioned in a notch in said body portion.

11. The corner frame member of claim 9 wherein said interference member comprises a raised locking tab on said body portion.

12. The corner frame member of claim 8 wherein said corner member is a molded one-piece structure made from a plastic material.

13. A pair of front-loading frame sections and an interconnecting corner member for a front-loading poster frame comprising:

a first frame section comprising a first elongated base member with a first elongated edge having opposed ends and a first elongated cover member with a first elongated edge having opposite ends, said base member and said cover member being hingedly connected together by a first elongated hinge member positioned along said two respective elongated edges;

first spring means for biasing said first cover member to said first base member;

said first base member in a closed position having first channel means therein;

the ends of said first base member being trimmed substantially perpendicular to its longitudinal axis and the ends of said first cover member being trimmed at a 45° miter relative to its longitudinal axis;

a second frame section comprising a second elongated base member having opposite ends and a second elongated cover member having opposite ends hingedly connected together by a second elongated hinge member along respective elongated edges of said second base and second cover members;

second spring means for biasing said second cover member to said second base member in a closed position;

said second base member having second channel means therein;

the ends of said second base member being trimmed substantially perpendicular to its longitudinal axis and the ends of said second cover member being trimmed at a 45° miter relative to its longitudinal axis;

the corner member being positioned between said first and second frame sections for interconnecting and holding them together forming a corner structure for one portion of a poster frame;

said corner member having first means for connection to said first base member and second means for connection to said second base member;

said corner member having hinge member extension means thereon corresponding to and in axial alignment with portions of said first elongated hinge member and said second elongated hinge member;

said corner member having means thereon for holding at least said first cover member in position and preventing said first cover member from sliding longitudinally relative to said first base member;

said mitered ends of said first and second cover members fitting together covering said corner member when said first and second frame sections are in their closed positions.

* * * * *

UNITED STATES PATENT AND TRADEMARK OFFICE
CERTIFICATE OF CORRECTION

PATENT NO. : 5,307,575

DATED : May 3, 1994

INVENTOR(S) : Bengt Ivansson et al.

It is certified that error appears in the above-identified patent and that said Letters Patent is hereby corrected as shown below:

Column 6, line 1; "/" should be --40'--.

Column 7, lines 14-15; "opposed" should be --opposite--.

Signed and Sealed this

Twenty-fifth Day of October, 1994

Attest:

BRUCE LEHMAN

*Attesting Officer*            *Commissioner of Patents and Trademarks*